(12) United States Patent
Liu

(10) Patent No.: US 7,630,879 B2
(45) Date of Patent: Dec. 8, 2009

(54) TEXT SENTENCE COMPARING APPARATUS

(75) Inventor: Shaoming Liu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 970 days.

(21) Appl. No.: 10/658,775

(22) Filed: Sep. 10, 2003

(65) Prior Publication Data
US 2004/0162806 A1 Aug. 19, 2004

(30) Foreign Application Priority Data
Sep. 13, 2002 (JP) .............................. 2002-268728

(51) Int. Cl.
*G06F 17/27* (2006.01)
(52) U.S. Cl. ...................... 704/9; 704/7; 704/8; 704/10
(58) Field of Classification Search ....................... 704/9
See application file for complete search history.

(56) References Cited

U.S. PATENT DOCUMENTS

| | | | |
|---|---|---|---|
| 6,076,051 A | | 6/2000 | Messerly et al. |
| 6,112,168 A * | | 8/2000 | Corston et al. .................. 704/9 |
| 6,374,209 B1 * | | 4/2002 | Yoshimi et al. ................. 704/9 |
| 6,871,174 B1 * | | 3/2005 | Dolan et al. .................... 704/9 |
| 7,016,829 B2 * | | 3/2006 | Brill et al. ...................... 704/9 |

FOREIGN PATENT DOCUMENTS

| | | |
|---|---|---|
| CN | 1252876 A | 5/2000 |
| JP | A-2000-148793 | 5/2000 |
| JP | A-2001-511564 | 8/2001 |
| WO | WO 99/05618 | 2/1999 |
| WO | WO 99/05621 | 2/1999 |

OTHER PUBLICATIONS

Shaoming Liu and Eiichi Tanaka, Algorithms for computing the Distances between Unordered Trees, 1996, Electronics and Communications in Japan, Part 3, vol. 79, No. 10, pp. 88-102.*

(Continued)

*Primary Examiner*—Richemond Dorvil
*Assistant Examiner*—Leonard Saint Cyr
(74) *Attorney, Agent, or Firm*—Oliff & Berridge, PLC

(57) ABSTRACT

A text sentence comparison method includes converting a first text sentence and a second text sentence into a first R tree (or a first RO tree) and a second R tree (or a second RO tree), respectively, calculating a distance between the first R tree and the second R tree (or a distance between the first RO tree and the second RO tree) on the basis of a distance between two R trees (or a distance between two RO trees), which is defined at least in accordance with a condition of a mapping between vertexes of the two R trees (or the two RO trees), and calculating a distance between the first text sentence and the second text sentence on the basis of the calculated distance between the first R tree and the second R tree (or the calculated distance between the first RO tree and the second RO tree).

18 Claims, 8 Drawing Sheets

OTHER PUBLICATIONS

M. Yamamoto et al., a Parallel Algorithm for a Tree Distance, The Institute of Electronics, Information and Communication Engineers, Jan. 26, 1996, p. 1-10, vol. 95, No. 498, Japan.

Harada et al., "Japanese Semantic Analysis System Sage using EDR", Japanese Society for Artificial Intelligence. 2001, 16(1), pp. 85-93 (w/English-language Abstract).

Aizawa, "A Quantitative Representation of Features based on Words and Documents Co-occurrences", Natural Language Processing, Mar. 2000, 136-4, pp. 25-32 (w/English-language Abstract).

Ma et al., "Self-Organizing Semantic Map of Japanese Nouns", Information Processing Society of Japan, vol. 42, No. 10, Oct. 2001, pp. 2379-2391 (w/English-language Abstract).

Tanaka, "The Metric between Trees Based on the StronglyStructure Preserving Mapping and Its Computing Method", The Institute of Electronics, Information and Communication Engineers, 1984, vol. J67-D, No. 6, pp. 722-723.

Liu et al., "Algorithms for Computing the Distances between Unordered Trees", The Institute of Electronics Information and Communication Engineers, 1995, vol. J78-A, No. 10, pp. 1358-1371 (w/English-language Translation).

U.S. Appl. No. 10/658,812, filed Sep. 10, 2003, Liu.

* cited by examiner

A/DT teacher/NN teaches/VBZ English/NNP to/TO students/NNS

Where, DT indicates Determiner, NN indicates Noun(singular or mass),
VBZ indicates Verb(3rd ps. sing.Present), NNP indicates Proper noun(singular),
TO indicates to, and NNS indicates Noun(plural).

FIG. 6
| | | |
|---|---|---|
| CASE CATEGORY 1 | CASE CATEGORY 1 | DISTANCE VALUE 11 |
| CASE CATEGORY 1 | CASE CATEGORY 2 | DISTANCE VALUE 12 |
| .............. | .............. | |
| CASE CATEGORY 1 | CASE CATEGORY m | DISTANCE VALUE 1m |
| .............. | .............. | |
| CASE CATEGORY m | CASE CATEGORY 1 | DISTANCE VALUE m1 |
| CASE CATEGORY m | CASE CATEGORY 2 | DISTANCE VALUE m2 |
| .............. | .............. | |
| CASE CATEGORY m | CASE CATEGORY m | DISTANCE VALUE mm |
FIG. 7
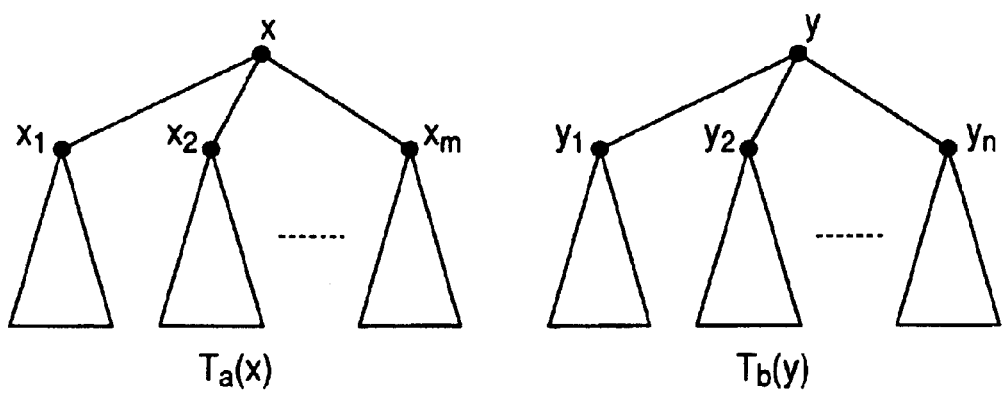
FIG. 8
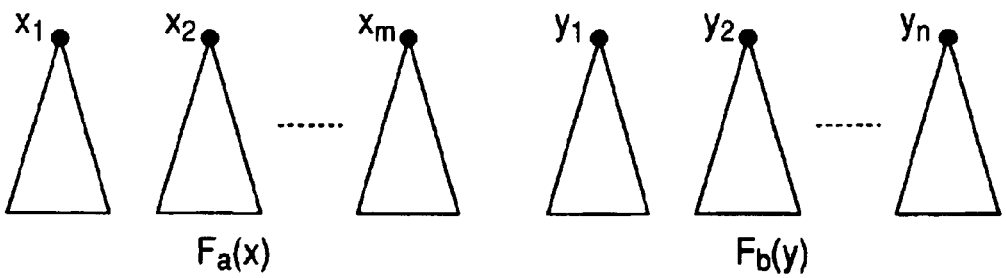

TEXT SENTENCE COMPARING APPARATUS

The present disclosure relates to the subject matter contained in Japanese Patent Application No. 2002-268728 filed on Sep. 13, 2002, which is incorporated herein by reference in its entirety.

BACKGROUND OF THE INVENTION

1. Field of the Invention

The present invention is relates to an apparatus/method for comparing text sentences with each other to check differences in semantic contents by using, for example, a computer. More specifically, the present invention relates to an apparatus/method for comparing text sentences in high precision and in real time.

2. Description of the Related Art

Since IT technology has made rapid progress, especially, high-speed Internet mobile technology has made rapid progress, very large amounts of information may be utilized by anybody, anywhere, and anytime. Conversely, a so-called "information-flood phenomenon" may occur, so that users can hardly acquire such information which is truly required for these users. To realize such a world that proper information can be continuously acquired even under any conditions of users, the information which owns true values for these users must be extracted/reconstructed from such an information flood.

In this case, techniques for comparing semantic contents of documents with each other, techniques for classifying text documents in accordance with the semantic contents, and techniques related to understandings of information searching intentions of users may constitute important aspects. Also, in order to realize the comparisons of the semantic contents of the documents, the classifications of the text documents, and the understandings of the information searching intentions of the users, similarity judgments as to meaning by utilizing natural language processing technologies are necessarily required.

In this field, several sorts of technical ideas for judging similarity between text sentences have been proposed. However, the major technical ideas among them utilize local information of sentences, for example, word information appeared in sentences and dependency relation information between words, and therefore, can be hardly applied as evaluation bases of semantic contents of text sentences, namely cannot realize such a goal that the semantic contents of the documents are compared with each other, and the information searching intentions of the users are understood.

Very recently, such a method has been proposed. That is, text sentences are semantically analyzed, the analyzed text sentences are represented in the form of graphs, and then, experimental similarity are measured based upon the graphic representations. However, the proposed similarity has been measured not by considering structural changes, and also there is no clear definition in a relationship between the definitions of the similarity and the differences in the semantic contents of the text sentences.

As examples of the conventional techniques related to the present invention, the below-mentioned prior art has been proposed.

[Non-Patent Publication 1]

"Japanese Semantic Analysis System SAGE using EDR" written by Harada and Mizuno, "Japanese Society for Artificial Intelligence" in 2001, 16(1), pages 85 to 93.

[Non-Patent Publication 2]

"A Quantitative Representation of Features based on Words and Documents Co-occurences" written by Shoko Aizawa, "Natural Language Processing" in March, 2000, 136-4.

[Non-Patent Publication 3]

"Self-Organizing Semantic Map of Japanese Nouns" written by Q. Ma, "Information Processing Society of Japan", volume 42, No. 10, in 2001.

[Non-Patent Publication 4]

"The Metric Between Trees based on the Strongly Structure Preserving Mapping and Its Computing Method" written by Tanaka, "The Institute of Electronics, Information and Communication Engineers", volume No. J67-D, No. 6, pages 722 to 723, in 1984.

[Non-Patent Publication 5]

"Algorithms for computing the Distances between un ordered Trees" written by Liu and Tanaka, "The Institute of Electronics Information and Communication Engineers", volume No. J78-A, No. 10, pages 1358 to 1371, in 1995.

As previously described in the above prior art, the conventional systems contain such problems that the performance of comparing the similarity of the semantic contents between the text sentences is still inadequate. Also, the conventionally proposed similarity can be hardly linked to the explanations as to the differences in the semantic contents between the text sentences.

SUMMARY OF THE INVENTION

The present invention has been made to solve the above-explained problems. It is an object of the invention to provide an apparatus and a method, which can compare differences in semantic contents between text sentences in high precision and in real time. Furthermore, specifically, in the text sentence comparing apparatus/method according to the present invention, for instance, in order to realize comparisons between semantic contents of documents, classifications of text documents based on semantic contents, and understandings of information searching intentions by users, a distance, which can measure differences in semantic contents between text sentences is defined in a mathematical formalism. Also, this distance can be obtained in real time.

In order to achieve the above-described object, in a text sentence comparing apparatus according to the present invention, comparing operations between text sentences are carried out in accordance with the below-mentioned manner.

In other words, a tree representing section represents text sentences to be compared with each other as rooted trees on graph theory. A vertex information applying section applies information produced based on the text sentences to respective vertexes of the trees represented by the tree representing section. A tree distance defining section defines a distance between the trees, which is based on a correspondence relationship among the vertexes. A tree distance acquiring section acquires the distance between the trees defined by the tree distance defining section. A tree distance applying section applies the distance between the trees to a distance indicative of a difference (or similarity) between the text sentences. A distance between text sentences acquiring section acquires a distance between the text sentences to be compared with each other based on the application by the tree distance applying section.

Therefore, as to two text sentences to be compared with each other, the entire constructions and the meaning of the text sentences are represented as rooted trees on the graph theory. Then, a semantic difference between these two text sentences can be considered based on a distance between these two text sentences, which is calculated by applying thereto a distance between the two trees, so that comparing operation between the text sentences can be carried out in high precision and in real time.

In this case, in accordance with the present invention, since distances between trees on the graph theory are applied to comparing operations of text sentences, not only word information and case information contained in these text sentences, but also constructions of these text sentences are taken into consideration.

Also, distances between text sentences maybe classified into four sorts of distances by judging as to either trees, which are rooted and ordered, or trees, which are rooted and not ordered, are employed, and also, by judging as to either both word information and case information or only word information is employed. The four sorts of distances can be arbitrarily selected based on calculation speeds and comparison precision in application field.

It should be understood that such a tree, which is rooted and ordered on the graph theory, is referred to as an "RO tree (Rooted and Ordered Tree)", whereas such a tree, which is rooted and not ordered, is referred to as an "R tree (Rooted and Unordered Tree)" in this specification.

When an RO tree is compared with an R tree, generally speaking, the RO tree can be calculated in a simple manner as compared with the R tree, whereas meaning comparing precision of the R tree is higher than that of the RO tree.

Also, in accordance with the present invention, various sorts of information may be employed as the word information. For example, the word information may include word attribute information. This word attribute information, for example, may include part-of-speech information, which is acquired by way of a morphological analysis. Also, in the case of a verb, information as to a conjugation may be used.

Also, a sort of dependency relation between words corresponds to a case.

Also, in such a case that both word information and case information are employed, for instance, text sentences are semantically analyzed to obtain word information and case information. Alternatively, the text sentences may be parsed to obtain the word information and the case information (the dependency relation between words).

Also, when only word information is employed, for example, the text sentences are parsed to obtain the word information. Alternatively, for instance, meaning of text sentences may be semantically analyzed to obtain the word information.

Also, as a mapping condition between R trees, for example, such a condition that "the mapping is a one-to-one mapping, parent-child relationship (hierarchical relationship) is preserved, and structures of R trees are preserved" may be used.

Also, as a mapping condition between RO trees, for example, such a condition that "the mapping is a one-to-one mapping, parent-child relationship (hierarchical relationship) is preserved, right/left relationship between brothers is preserved, and structures of RO trees are preserved" may be used.

Also, when a tree A is mapped to a tree B, for instance, a case in which a vertex of the tree "A" is mapped to a vertex of the tree "B" corresponds to a "substitution"; a vertex, which is located in the tree A and cannot be mapped, corresponds to a "depletion"; and a vertex, which is located in the tree B and cannot be mapped corresponds to an "insertion".

Also, as a distance between trees, for example, a minimum value of sum of weight (sum of mapping weight) in a case where one tree is mapped to another tree may be employed Further, this distance between trees implicitly includes a distance between forests.

Also, as a method of applying numbers to respective vertexes of either an RO tree or an R tree, for example, the following method may be utilized. That is, while the numbers are allotted to the respective vertexes in an increment manner by the way of a depth-priority searching operation, distances are calculated in an order from the vertexes having larger numbers. Specifically, distances are sequentially calculated from a subtree located on the lowest side to a subtree located on the upper side by employing a dynamic scheme method.

Also, a label is used in order to store information thereinto.

Furthermore, a structural example of the present invention will now be described as follows: (1) A semantic content of text sentences comparing apparatus obtains a distance measuring semantic contents between text sentences. The comparing apparatus includes means for representing structures and meaning of the entire text sentences as RO trees or R trees, means for applying word information and dependency relation information between words (or case information) to each vertex of the RO trees or the R trees or applying only word information to each vertex of the RO trees or the R trees, means for defining a distance between RO trees or R trees, which is only based on correspondence relation between the vertexes, means for obtaining the defined distance between the RO trees or the R trees, means for applying the distance between the RO trees or R trees to a distance comparing semantic differences between the text sentences, and means for obtaining the distance between the text sentences.

(2) The means for defining the distance between RO trees or R trees, which is based on the correspondence relation between the vertexes, includes label allocation means for allocating labels to each vertex of the RO trees or R trees on the graph theory, number allocation means for allocating number to each vertex of the RO trees or R trees, mapping means for performing mapping between the RO trees or the R trees, on the basis of the correspondence relation between the vertexes and mapping conditions between the RO trees or the R trees, which are based on the correspondence relation between vertexes, mapping means for performing mapping between ordered forests based on the correspondence relation between the vertexes, mapping means for performing mapping between unordered forests based on the correspondence relation between the vertexes, mapping weight setting means for defining weights of the mappings performed by these mapping means, means for defining a distance between the ordered forests based on the mapping means for performing the mapping between the ordered trees and the mapping weight setting means, means for defining a distance between the unordered trees based on the mapping means performing the mapping between the unordered trees and the mapping weight setting means, means for defining a distance between the RO trees or R trees based on the mapping means for performing the mapping between the RO trees or the R trees and the mapping weight setting means.

(3) The means for applying the distance between the RO trees or R trees to a distance comparing semantic differences between the text sentences includes means for making mapping between words and mapping between cases correspond to mapping between vertexes of the RO trees or the R trees, means for substituting word substitution weights and case substitution weights for a function to making a value of the function correspond to weight of substitution between the vertexes of the RO trees or the R trees, means for substituting word deletion weights and case deletion weights for another function to making a value of another function correspond to deletion weight of the vertexes of the RO trees or the R trees, means for substituting word insertion weights and case insertion weights for still another function to make a value of still another function correspond to insertion weights of the vertexes of the RO trees or the R trees, means for setting the mapping weights between words, and means for setting the mapping weights between cases.

(4) The means for applying the distance between the RO trees or R trees to a distance comparing semantic differences between the text sentences includes means for making the mapping between the words correspond to the mapping between the vertexes of the RO trees or the R trees, means for making the word substitution weights correspond to the vertex substitution weight of the RO trees or the R trees, means for making the word deletion weights correspond to the deletion weights of the vertexes of the RO trees or the R trees, means for making the word insertion weights correspond to the insertion weights of the vertexes of the RO trees or the R trees, and means for setting the mapping weights between words.

(5) The means for obtaining the distance between the text sentences sets the distance obtained by the means for obtaining the distances between either the RO trees or the R trees as the distance between the text sentences.

(6) The means for obtaining the distance between the text sentences sets a result obtained by dividing the distance obtained by the means for obtaining the distances between the RO trees or the R trees by a summation of total numbers of vertexes of the RO trees or the R trees.

(7) The means for setting the mapping weights between the words includes means for setting the substitution weights between the words stored in the each vertex when two vertexes are mapped in the mapping between the RO trees or the R trees, means for setting the deletion weights of the words stored in each vertex when the vertexes cannot be mapped and are deleted, means for setting the insertion weights of the words stored in each vertex when the vertexes cannot be mapped and are inserted, means for setting relation among the word substitution weights, the word deletion weights, and the word insertion weights.

(8) The means for setting the mapping weights between the cases includes means for setting the substitution weights between cases stored in each vertexes when two vertexes are mapped in the mapping between the RO trees or the R trees, means for setting the deletion weight of the cases stored in the vertexes when the vertexes cannot be mapped and are deleted, means for setting the insertion weight of the cases stored in the vertexes when the vertexes cannot be mapped and are inserted, means for setting relation among the case substitution weights, the case deletion weights, and the case insertion weights.

(9) The means for setting the word substitution weight includes means for setting the word substitution weight to 0 when two words are the same word, and means for setting positive constant value to the word substitution weight when the two words are different.

(10) The means for setting the word substitution weights sets the word substitution weights as a distance between two words.

(11) The means for setting the word deletion weight sets the word deletion weight as a constant.

(12) The means for setting the word deletion weight sets the word deletion weight based upon a part-of-speech of the word.

(13) The means for setting the word insertion weight sets the word insertion weight as a constant.

(14) The means for setting the word insertion weight sets the word insertion weight as a constant.

(15) The means for setting the relation among the word substitution weight, the word deletion weight, and the word insertion weight establishes a relationship satisfying "the word deletion weight+the word insertion weight>the word substitution weight".

(16) The means for setting the case substitution weight includes means for setting the case substitution weights to zero when two cases are identical to each other, and means for setting the case substitution weights to positive constants when two cases are different from each other.

(17) The means for setting the case substitution weight includes means for classifying all of cases into a plurality of N categories, means for setting the substitution weight between the categories of the cases, and means for setting the substitution weight between cases as the substitution weights between categories to which two cases belong, respectively.

(18) The means for setting the case deletion weight sets the case deletion weight as a constant.

(19) The means for setting the case deletion weight sets the case deletion weight based upon a sort of a case.

(20) The means for setting the case insertion weight sets the case insertion weight as a constant.

(21) The means for setting the case insertion weight sets the case insertion weight based upon a sort of a case.

(22) The means for setting the relation among the case substitution weight, the case deletion weight, and the case insertion weight establishes such a relation satisfying "the case deletion weight+the case insertion weight>the case substitution weight.

A semantic content of text sentences comparing method obtains a distance measuring semantic contents between text sentences. The comparing method includes representing structures and meaning of the entire text sentences as RO trees or R trees, applying word information and dependency relation information between words (or case information) to each vertex of the RO trees or the R trees or applying only word information to each vertex of the RO trees or the R trees, defining a distance between RO trees or R trees, which is only based on correspondence relation between the vertexes, obtaining the defined distance between the RO trees or the R trees, applying the distance between the RO trees or the R trees to a distance comparing semantic differences between the text sentences, and obtaining the distance between the text sentences.

BRIEF DESCRIPTION OF THE DRAWINGS

FIG. 6 is a diagram for indicating an example of a data structure of a table (list) of distances among case categories.

FIG. 7 is a diagram for indicating an example of two subtrees, which are constituted by either RO trees or R trees.

FIG. 8 is a diagram for indicating an example of two forests, which are constituted by either RO trees or R trees.

DETAILED DESCRIPTION OF THE PREFERRED EMBODIMENT

Referring now to drawings, an embodiment of the present invention will be described.

Figure 1:
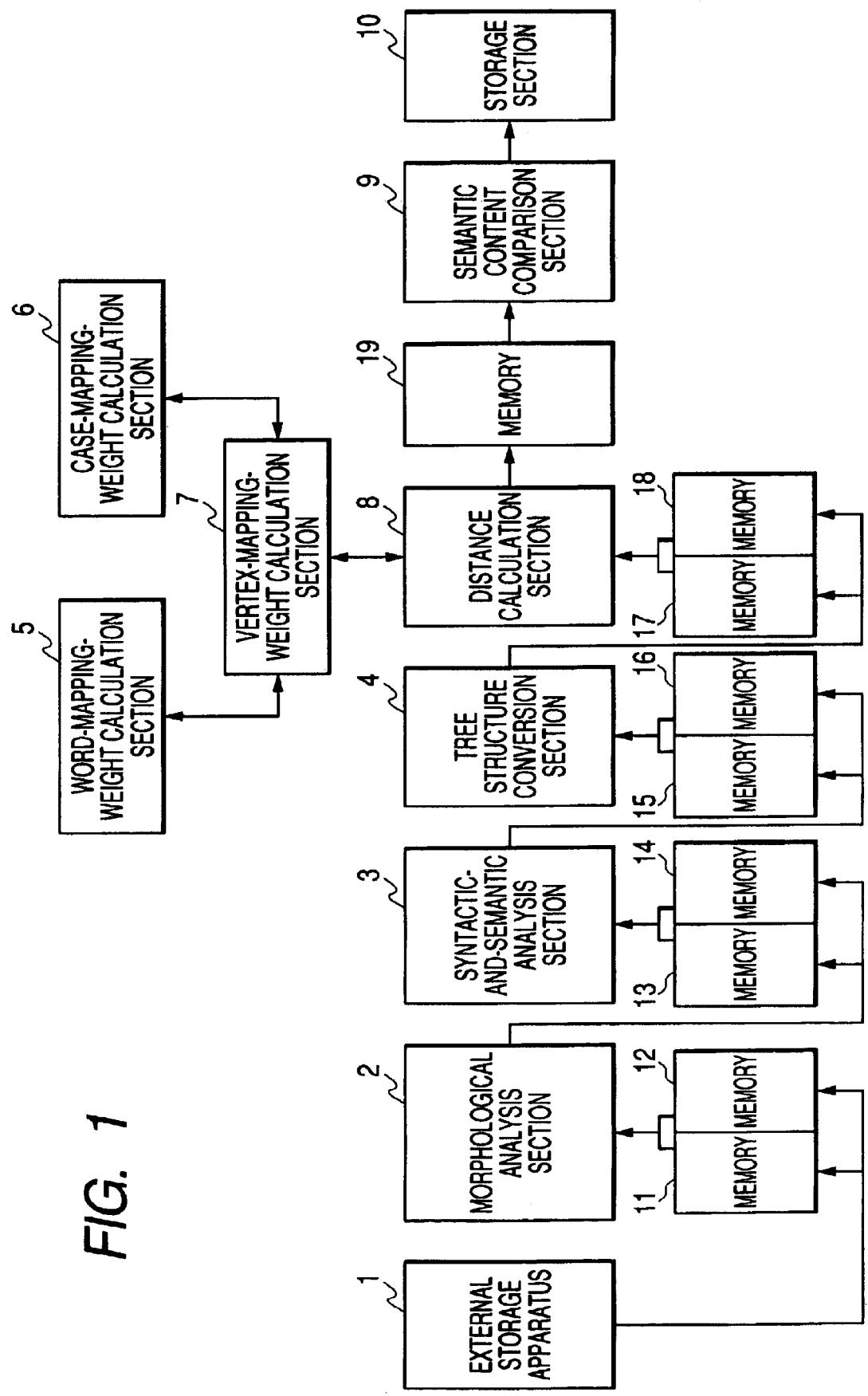
FIG. 1 is a diagram for indicating a structural example of an apparatus for comparing semantic contents of text sentences according to an embodiment of the present invention.

FIG. 1 indicates an example of an apparatus for comparing semantic contents of text sentences with each other (namely, text sentence comparing apparatus) according to an embodiment of the present invention. This text sentence comparing apparatus executes a method for comparing semantic contents of text sentences with each other according to the embodiment of the present invention.

The text sentence comparing apparatus shown in FIG. 1 includes an external storage apparatus 1, a morphological analysis section 2, a syntactic-and-semantic analysis section 3, a tree structure conversion section 4, a word-mapping-weight calculation section 5, a case-mapping-weight calculation section 6, a vertex-mapping-weight calculation section 7, a distance calculation section 8, a semantic content comparison section 9, a storage section 10, and a plurality of memories 11 to 19. The morphological analysis section 2 extracts morphemes of a text sentence. The syntactic-and-semantic analysis section 3 analyzes a dependency relation of a text sentence (sentence structure), or analyzes meaning of the text sentence. The tree structure conversion section 4 converts the analyzed result of the syntactic-and-semantic analysis section 3 into either an RO tree or an R tree on graph theory. The word-mapping-weight calculation section 5 calculates a word substitution weight at a time when two words are substituted, a word deletion weight at a time when a word is deleted, and a word insertion weight at a time when a word is inserted. The case-mapping-weight calculation section 6 calculates a case substitution weight at a time when two cases are substituted, a case deletion weight at a time when a case is deleted, and a case insertion weight at a time when a case is inserted. The vertex-mapping-weight calculation section 7 calculates a vertex substitution weight, a vertex deletion weight, and a vertex insertion weight of either an RO tree or an R tree. The distance calculation section 8 calculates a distance between either RO trees or R trees. The semantic content comparison section 9 obtains a difference in semantic contents between text sentences The storage section 10 is constituted by, for example, a memory.

It should be noted that when only word information appeared in a text sentence is stored in either a vertex of an RO tree or a vertex of an R tree, namely, when case information is not employed, the text sentence comparing apparatus may not include the case-mapping-weight calculation section 6.

Also, when both the word information and case information, which appear in a text sentence, are stored in either a vertex of an RO tree or a vertex of an R tree at the same time, the vertex-mapping-weight calculation section 7 substitutes a calculation result of the word-mapping-weight calculation section 5 and a calculation result of the case-mapping-weight calculation section 6 for a function, and provides a result of this function calculation to the distance calculation section 8 as a vertex mapping weight.

Also, data of text sentences have been stored in the external storage apparatus 1.

The memory 11 and the memory 12 store thereinto data of two text sentences read out from the external storage apparatus 1, respectively. The memory 13 and the memory 14 store thereinto analysis results of the two text sentences made by the morphological analysis section 2 respectively. The memory 15 and the memory 16 store thereinto either syntax analysis results of the two text sentences or semantic analysis results of the two text sentences, respectively. The memory 17 and the memory 18 store thereinto conversion results of the two text sentences made by the tree structure conversion section 4. The memory 19 stores thereto either a distance between RO trees or a distance between R trees, which are calculated by the distance calculation section 8.

Alternatively, it should be noted that these memories 11 to 19 may be integrated, or the text sentence comparing apparatus may be constructed without using these memories 11 to 19.

The morphological analysis section 2 extracts both morphemes and attributes of the two text sentences stored in the memory 11 and the memory 12, and then stores the analysis results of the respective text sentences into the memory 13 and the memory 14, respectively.

The syntactic-and-semantic analysis section 3 inputs thereinto the analysis results of the morphemes stored in the memory 13 and the memory 14, analyzes either dependency relation (sentence structure) of the text sentences or meaning of the text sentences, and then stores analysis results of the respective text sentences into the memory 15 and the memory 16, respectively.

The tree structure conversion section 4 uses the results of the dependency relation (sentence structure) stored in the memory 15 and the memory 16 to convert the dependency relation (sentence structure) of the text sentences into either RO trees or R trees, and then, stores only word information (including attributes of words), which appears in the text sentences, in the vertexes of either the converted RO trees or the converted R tree. Alternatively, the tree structure conversion section 4 uses the results of the semantic analysis results stored in the memory 15 and the memory 16 to convert the results of the semantic analysis of the text sentences into either RO trees or R trees, and then, stores only word information (including attributes of words), which appears in the text sentences, and the related case information in the vertexes of either the converted RO tree or the converted R tree.

Also, the tree structure conversion section 4 stores the converted results of the respective text sentences into the memory 17 and the memory 18, respectively.

The word-mapping-weight calculation section 5 calculates a word substitution weight, a word deletion weight, and a word insertion weight, which are required for the vertex-mapping-weight calculation section 7.

The case-mapping-weight calculation section 6 calculates a case substitution weight, a case deletion weight, and a case insertion weight, which are required for the vertex-mapping-weight calculation section 7.

The vertex-mapping-weight calculation section 7 calculates a vertex mapping weight required to calculate either a distance between RO trees or a distance between R trees, and then, provides the calculated result to the distance calculation section 8.

The distance calculation section 8 calculates two distances between either the RO trees or the R trees stored in the memory 17 and the memory 18, and then, stores the calculated results thereof into the memory 19.

The semantic content comparison section 9 calculates a distance between the sentences by using either the distance between the RO trees or the distance between R trees stored in the memory 19, and then stores the calculated result into the storage section 10.

Next, a construction example of an information terminal apparatus to which an apparatus and a method for calculating a distance used to compare semantic contents between text sentences, according to the invention, are applied, as an application example.

Figures 2, 3:
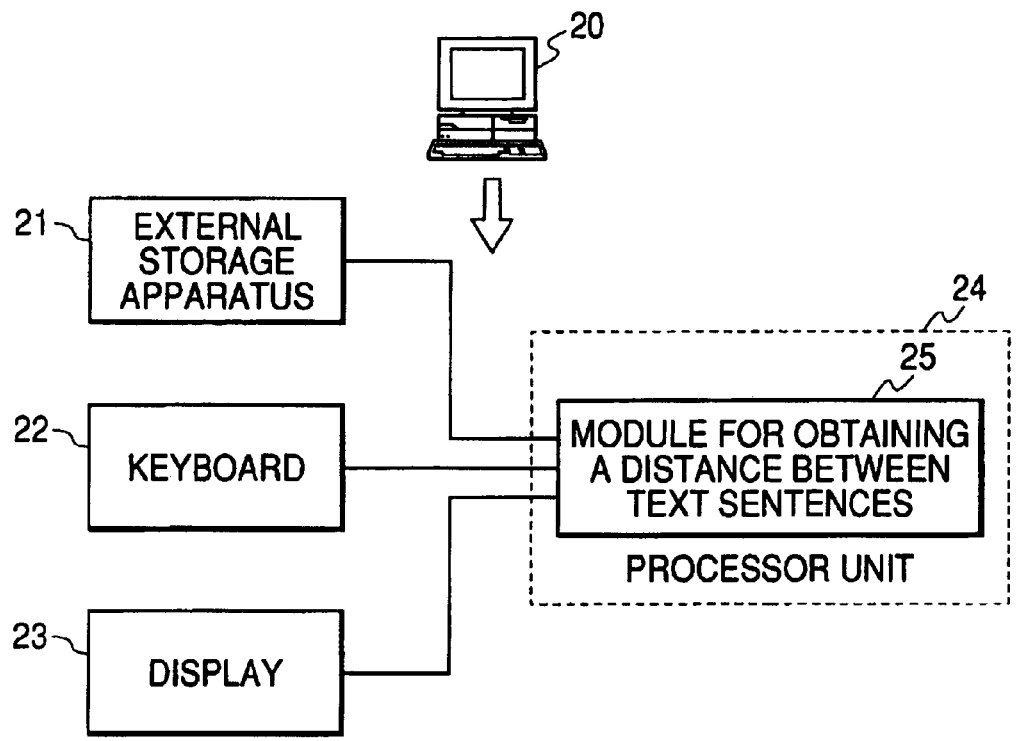
FIG. 2 is a diagram for showing a structural example in a case where an apparatus/method for comparing the semantic contents of the text sentences, according to the present invention, are applied to an information terminal apparatus.
FIG. 3 is a diagram for indicating an example of an analysis result made by a morphological analysis section.

FIG. 2 shows a construction example of an apparatus to which the method for calculating the distance used to compare the semantic contents between the text sentences, according to the present invention, is applied, as the application example.

The information terminal apparatus 20 shown in FIG. 2 includes an external storage apparatus 21, a keyboard 22, a display 23, and a processor unit 24. This processor unit 24 is equipped with a module 25 for obtaining a distance between text sentences.

The external storage apparatus 21 stores thereinto data of input text sentences, either a word feature dictionary or a thesaurus dictionary, which are used so as to obtain a word mapping weight, a weight dictionary used to obtain a case mapping weight, a result of a calculated distance between text sentences, software, and the like. This external storage apparatus 21 functions as a storage space used in a calculation. In this case, as to the word feature dictionary, the thesaurus dictionary, the weight dictionary, and the like, for example, these dictionaries have been previously formed, or existing dictionaries may be prepared. Also, specifically, the external storage apparatus 21 may be constituted by, for instance, a hard disk drive.

The keyboard 22 is an input apparatus used to instruct an operation by a user. It should also be noted that another input apparatus may be added thereto.

The display 23 corresponds to an output apparatus for displaying thereon a message with respect to the user, data or a text sentence, an analysis result, a calculation result of a distance, and the like. It should also be noted that another output apparatus may be additionally provided.

The processor unit 24 executes an actual process operation in accordance with the software or the like stored in the external storage apparatus 21. Specifically, this processor unit 24 may include, for example, a computer system such as a microprocessor and a personal computer. Then, the morphological analysis section 2, the syntactic-and-semantic analysis section 3, the tree structure conversion section 4, the word-mapping-weight calculation section 5, the case-mapping-weight calculation section 6, the vertex-mapping-weight calculation section 7, the distance calculation section 8, and the semantic content comparison section 9 maybe constructed by the software operated on this processor unit 24.

Next, operations of the apparatus for comparing differences in semantic contents between text sentences according to the embodiment of the present invention will now be explained in detail.

The external storage apparatus 1 has stored thereinto data of text sentences. The data of the two text sentences are read out from the external storage apparatus 1, and then, are stored into the memory 11 and the memory 12, respectively. The morphological analysis section 2 extracts the morphemes of the text sentences stored in the memory 11 and the memory 12, and then, stores the extracted results into the memory 13 and the memory 14, respectively.

In this case, as the morphological analysis tool, arbitrary morphological analysis tools which have been published maybe utilized. For instance, the morphological analysis tool "ChaSen" may be used, which has been produced by Matsumoto Laboratory of Nara Institute of Science and Technology.

Also, FIG. 3 indicates an analysis result of a morphological analysis with respect to such a sentence "a teacher teaches English to students"

The syntactic-and-semantic analysis section 3 inputs thereinto the results of the morphological analysis stored in the memory 13 and the memory 14, analyzes sentence structures of the text sentences, dependency relation (or case information) of the text sentences, deep structures of the text sentences, and the like, and then, stores the analyzed results into the memory 15 and the memory 16, respectively.

Here, as a syntax analysis tool and a semantic analysis tool, arbitrary syntax analysis tools and arbitrary semantic analysis tools may be utilized, which have been known. For example, the method described in the non-patent publication 1 may be employed (see non-patent publication 1).

The tree structure conversion section 4 inputs thereinto the analysis result stored in the memory 15 and the memory 16, converts the inputted analysis results into tree structures, and then, stores the converted tree structures into the memory 17 and the memory 18, respectively.

Figure 4:
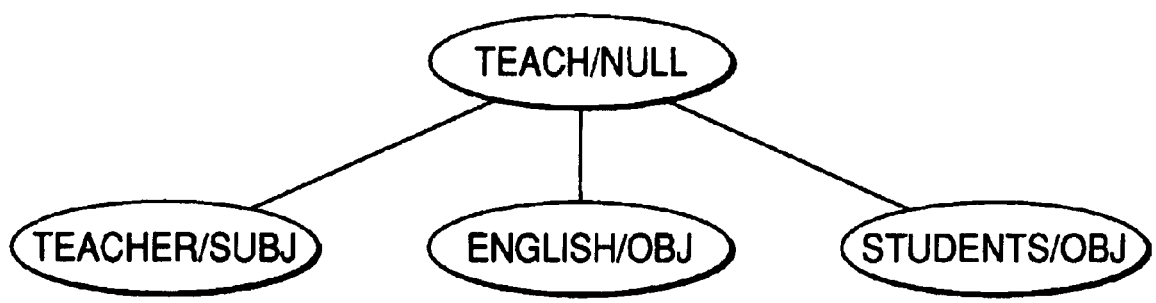
FIG. 4 is a diagram for representing an example of a representation of a tree structure.

FIG. 4 indicates a tree structure in which the analysis result of the semantic analysis of the text sentence "a teacher teaches English to students" is converted into a form of the tree structure. As word information and case information, "a teacher" and "SUBJ", "English" and "OBJ", "students" and "OBJ", and "teach" and "NULL" are stored in the vertexes, respectively.

Figure 5:
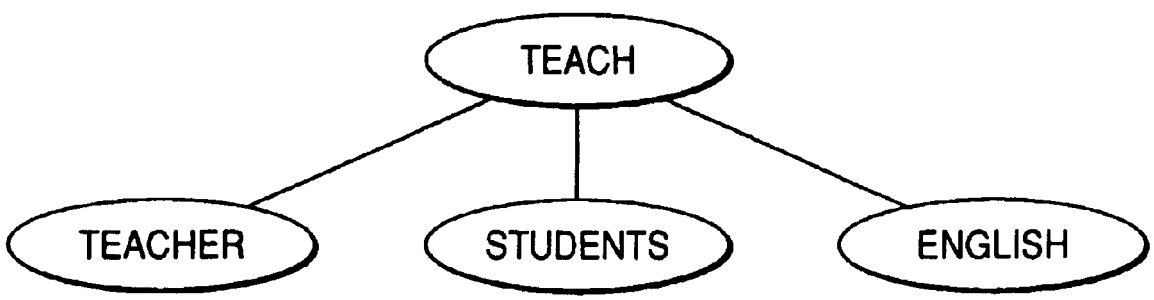
FIG. 5 is a diagram for showing another example of a representation of a tree structure.

Also, FIG. 5 indicates a tree structure in which the analysis result of the syntax analysis of the text sentence "a teacher teaches English to student" is converted into a form of the tree structure. As word information, "a teacher", "English", "students", and "teach" are stored in the vertexes, respectively.

In FIG. 4, as the case information, SUBJ (subjective case), OBJ (objective case), OBL (oblique case), and NULL (empty) are indicated. Alternatively, as the case information, an ADJUNCT (adjunct case) may be employed.

In this embodiment, in order to obtain differences between a tree $T_a$ and a tree $T_b$, consider a mapping set from the tree $T_a$ to the tree $T_b$, which satisfies a predetermined condition. Generally, in a mapping between two different trees, substitution, deletion, and/or insertion of vertexes occur. For example, in FIG. 11, a vertex "Hanako/SUBJ" of a left tree is deleted. Also, a vertex "wife/ADJUNCT" of the left tree is substituted for a vertex "wife/SUBJ" of a right tree. When weights are set with respect to the substitution, the deletion, and the insertion, differences between two trees can be evaluated using the weights. In this embodiment, this evaluation of the differences is referred to as "a distance between two trees". For example, a mapping $M_{Rmin}$, which has minimum sum of the weights, is obtained from among a mapping set $M_R$ satisfying a predetermined condition that "the mapping is a one-to-one mapping, parent-child relationship (hierarchical relationship) is preserved, a structure is preserved", and then, the sum of the weights of the mapping $M_{Rmin}$ is defined as the distance between R trees. Also, a mapping $M_{ROmin}$, which has minimum sum of the weights, is obtained from among a mapping set $M_{RO}$ satisfying another predetermined condition that "the mapping is a one-to-one mapping, parent-child relationship (hierarchical relationship) is preserved, right/left relationship between brothers is preserved, a structure is preserved", and then, the sum of the weights of the mapping $M_{ROmin}$ is defined as the distance between RO trees.

The word-mapping-weight calculation section 5 calculates the word substitution weight, the word deletion weight, and the word insertion weight in response to a request from the vertex-mapping-weight calculation section 7. Then, the word-mapping-weight calculation section 5 provides these calculated weights to the vertex-mapping-weight calculation section 7.

The word substitution weight may be a constant or may be set by using a distance between words. In the former case, when two words are the same words, the word substitution weight is set as zero. Conversely, when two words are not identical to each other, the word substitution weight is set to a positive constant. In the latter case, the word-substitution-weight calculation section 5 obtains a distance between two words, and sets a value of the obtained distance as the word substitution weight.

As a method of obtaining a distance between words, arbitrary known methods may be utilized. For instance, there are a statistical method, a method using a thesaurus dictionary, and a method using a neural network. As the statistical method, for instance, the distance between the words may be obtained by employing the tf·idf method described in the non-patent publication 2 (see non-patent publication 2). As the method using the thesaurus dictionary, for example, a length of a minimum path between concepts to which two words belong may be set as the distance between the words. As the method using the neural network, for instance, the method described in the non-patent publication 3 (see non-patent publication 3) may be employed. Also, other known methods may be used.

The word deletion weight may be a constant. Alternatively, the word deletion weight may be set in accordance with part-of-speech information of a word. In the latter case, a weight is allotted to a part-of-speech of a word, and the word deletion weight is a product of a part-of-speech weight by a constant. As a part-of-speech weight setting operation, for instance, it is preferable to apply a large weight to a part of speech having an important role. As one example, it may be possible to set that a weight of a verb is the largest weight, and weights of part-of-speech becomes smaller in order of an adjective verb, a noun, an adverb, and an adjective. Alternatively, part-of-speech weights may be set based upon other orders.

The word insertion weight may be a constant. Alternatively, the word insertion weight may be set based upon part-of-speech information of a word. In the latter case, a weight is allotted to a part-of-speech of a word. The word insertion weight is a product of a part-of-speech weight by a constant. As a part-of-speech weight setting method, a method similar to the part-of-speech weight setting method, which has been described with respect to the word deletion weight, may be used. Alternatively, the part-of-speech weight may be set based upon other different methods.

The case-mapping-weight calculation section 6 calculates a case substitution weight, a case deletion weight and a case insertion weight. Then, the case-mapping-weight calculation section 6 provides these calculated weights to the vertex-mapping-weight calculation section 7.

The case substitution weight may be a constant. Alternatively, the case substitution weight may be set using a distance between cases. In the former case, when two cases are the same case, the case substitution weight is set to zero. Conversely, when two cases are not identical to each other, the case substitution weight is set to a positive constant. In the latter case, the case-mapping-weight calculation section 6 obtains a distance between two cases and sets a value of the obtained distance as the case substitution weight.

In this case, one example of a method for obtaining the distance between cases will be given.

First, all of cases are classified into several categories depending upon contents thereof. It should be noted that number of elements in the categories is not less than 1 ($\geqq 1$).

Also, a table of distances among the case categories as shown in FIG. 6 is prepared. In the table shown in FIG. 6, with respect to all of combinations of a plurality (namely, "m" pieces) of case categories, the distances (i.e., distance value 11 to distance value mm) among the case categories are set.

Next, the case categories to which two cases belong, respectively, are obtained which are specified based upon two pieces of given case information. Also, a distance value between the two acquired case categories is obtained. Thus, this obtained distance value may be set as a distance between the two cases.

It should also be noted that another method may be employed as a method of obtaining the distance between cases.

The case deletion weight may be a constant. Alternatively, the case deletion weight may be set in accordance with a sort of a case. In the latter case, a weight is allotted to a case and a case deletion weight is a product of the case weight by a constant. As setting of the case weights, for example, it may be possible to set that, for instance, a weight of SUBJ is the largest weight. The weights may become smaller in order of OBJ, OBL, and ADJUNCT. Alternatively, the case weights may be set based upon other orders.

The case insertion weight may be a constant. Alternatively, the case insertion weight may be set in accordance with a sort of a case. In the latter case, a weight is allotted to a case and the case insertion weight is set as a product of the case weight by a constant. As setting of the case weights, for example, it may be possible to use a setting method similar to the method of setting the case weight as described with respect to the case deletion weight. Also, the case insertion weight may be set based upon other different setting methods.

The vertex-mapping-weight calculation section 7 obtains the vertex substitution weight, the vertex deletion weight, and the vertex insertion weight in response to a request from the distance calculation section 8. Then, the vertex-mapping-weight calculation section 7 provides the obtained weights to the distance calculation section 8.

Specifically, the vertex-mapping-weight calculation section 7 calculates the vertex substitution weight, the vertex deletion weight, and the vertex insertion weight, by using functions $S(x, y)$, $R(x)$, and $I(y)$.

As the function $S(x, y)$, $S(x, y)=xy_w+xy_c$ may be used, or $S(x, y)=xy_w+xy_c$ may be used. Also, other functions may be used. In this case, symbol "$xy_w$" indicates a substitution weight between a word, which has been stored in a vertex "x", and a word, which has been stored in a vertex "y", whereas symbol "$xy_c$" shows a substitution weight between a case, which has been stored in the vertex "x", and a case, which has been stored in the vertex "y". Also, when only the word information is stored in a vertex, a function $S(x, y)=xy_w$ may be used.

As the function $R(x)$, $R(x)=x_w+x_c$ may be used, or $R(x)=x_w \times x_c$ may be used. Alternatively, other functions maybe used. In this case, symbol "$x_w$" shows a deletion weight of a word, which is stored in the vertex "x", and symbol "$x_c$" represents a deletion weight of a case, which is stored in the vertex "x". Also, when only the word information is stored in a vertex, a function $R(x)=x_w$ may be used.

As the function I(y), $I(y)=y_w+y_c$ may be used, or $I(y)=y_w \times y_c$ maybe used. Alternatively, other functions maybe used. In this case, symbol "$y_w$" shows an insertion weight of a word, which is stored in a vertex "y", and symbol "$y_c$" represents an insertion weight of a case, which is stored in the vertex "y". Also, when only the word information is stored in a vertex, a function $I(y)=y_w$ may be used.

When the vertex-mapping-weight calculation section 7 requires the weights $x_w$, $y_w$, and $xy_w$, the vertex-mapping-weight calculation section 7 outputs to the word-mapping-weight calculation section 5 the word information along with a calculation request. Upon being input the calculation request, the word-mapping-weight calculation section 5 obtains the weights $x_w$, $y_w$, and $xy_w$ on the basis of the word information (words and part-of-speech information) to output the obtained weights to the vertex-mapping-weight calculation section 7. Similarly, when the vertex-mapping-weight calculation section 7 requires the weights $x_c$, $y_c$, and $xy_c$, the vertex-mapping-weight calculation section 7 outputs to the case-mapping-weight calculation section 6 the case information along with a calculation request. Upon being input the calculation request, the case-mapping-weight calculation section 6 obtains the weights $x_c$, $y_c$, and $xy_c$ on the basis of the case information to output the obtained weights to the vertex-mapping-weight calculation section 7.

The distance calculation section 8 obtains a distance between either RO trees or R trees stored in the memory 17 and the memory 18, and then, stores the obtained result into the memory 19. When the vertex substitution weight, the vertex deletion weight, and the vertex insertion weight are required for the calculation of the distance between the trees, the distance calculation section 8 outputs to the vertex-mapping-weight calculation section 7 the word information and the case information of the two text sentences to be compared along with a calculation request. Upon being input the calculation request, the vertex-mapping-weight calculation section 7 obtains the required weights on the basis of the word information and the case information to output the obtained weights to the distance calculation section 8.

With regard to the RO tree, the distance between RO trees only based upon a correspondence relationship between vertexes may be obtained by, for instance, the method described in the non-patent document 4 (see non-patent document 4).

Next, a method for calculating the distance between RO trees by the method described in the non-patent document 4 will be explained.

First, in order to describe a distance between RO trees, relative symbols are defined as follows:

A subtree in which a vertex "x" of an RO tree "$T_a$" is a root is expressed by "$T_a(x)$".

The set of vertexes of the subtree $T_a(x)$ is represented as "$V_a(x)$".

The children of the vertex "x" are represented as "$x_1$", "$x_2$", - - - , "$x_m$". The set of the children of the vertex "x" is expressed by "Ch(x)".

Also, in the specification, a portion constructed by subtrees $T_a(x_1)$, $T_a(x_2)$, - - - , $T_a(x_m)$ are referred to as a forest. The forest is expressed as "$F_a(x)$".

FIG. 7 shows, for example, two subtrees $T_a(x)$ and $T_b(y)$, which are RO trees.

First, numbers are allotted to vertexes from a root of the RO tree in depths first order (by way of a depth-priority searching). Compute the distance between the smallest subtrees (consists of one vertex) firstly, and then using the above results, compute the distance between larger subtrees, and finally, we can get the distance between the two RO trees.

A distance "$D(T_a(x), T_b(y))$" between the two RO trees $T_a(x)$ and $T_b(y)$ indicated in FIG. 7 can be obtained using the formula 1. It is so assumed that distance between ordered forests "$D(F_a(x), F_b(y))$" and all distances between subtrees $D(T_a(x_i), T_b(y))$, $D(T_a(x), T_b(y_i))$ have already been obtained. Also, symbol "A-B" shown in the formula 1 indicates a function for removing all elements of a set B from a set A.

$$D(T_a(x), T_b(y)) = \min \begin{cases} S(x, y) + D(F_a(x), F_b(y)), \\ \min_{x_i \in Ch(x)} \{D(T_a(x_i), T_b(y)) + \sum R(k) \mid k \in (V_a(x) - V_a(x_i))\}, \\ \min_{y_i \in Ch(y)} \{D(T_a(x), T_b(y_i)) + \sum I(k) \mid k \in (V_b(y) - V_b(y_j))\}, \end{cases} \quad \text{formula 1}$$

FIG. 8 indicates two ordered forests $F_a(x)$ and $F_b(y)$.

A distance between the two forest $F_a(x)$ and $F_b(y)$ shown in FIG. 8, that is, "$D(F_a(x), F_b(y))$" can be obtained using a formula 2. A symbol "|A|" indicates total number of elements of a set A.

(2-1) boundary condition ($1 \leq I \leq |Ch(x)|$, $1 \leq j < |Ch(y)|$)

$d(0,0)=0$;

$$d(i, 0) = d(i-1, 0) + \sum R(k) \mid k \in V_a(x_i);$$
$$d(0, j) = d(0, j-1) + \sum I(k) \mid k \in V_b(y_i);$$

(2-2) calculation of d(i, j) ($1 \leq I \leq |Ch(x)|$, $1 \leq j \leq |Ch(y)|$)

$$d(i, j) = \min \begin{cases} d(i-1, j-1) + D(T_a(x_i), T_b(y_i)), \\ d(i, j-1) + \sum I(k) \mid k \in V_b(y_j), \\ d(i-1, j) + \sum R(k) \mid k \in V_a(x_i), \end{cases};$$

(2-3)

$$D(F_a(x), F_b(y)) = d(|Ch(x)|, |Ch(y)|) \quad \text{formula 2}$$

In the formula 1, when the vertex "x" is a leaf (i.e., Ch(x)=NULL: empty set), apparently, a second term of a right hand of the formula 1 need not be calculated. Therefore, the distance $D(T_a(x), T_b(y))$ may be calculated by using formula 3.

Also, in the formula 1, when the vertex "y" is a leaf (i.e. Ch(y)=NULL: empty set), apparently, a third term of the right hand of the formula 1 need not be calculated. Therefore, the distance $D(T_a(x), T_b(y))$ may be calculated by using formula 4.

$$D(T_a(x), T_b(y)) = \min \begin{cases} S(x, y) + D(F_a(x), F_b(y)), \\ \min_{y_i \in Ch(y)} \{D(T_a(x), T_b(y_i)) + \sum I(k) \mid k \in (V_b(y) - V_b(y_i))\}, \end{cases} \quad \text{formula 3}$$

-continued $$D(T_a(x), T_b(y)) = \min \quad \text{formula 4}$$
$$\begin{cases} S(x, y) + D(F_a(x), F_b(y)), \\ \min_{xi \in Ch(x)} \{D(T_a(x_i), T_b(y)) + \sum R(k) \mid k \in (V_a(x) - V_a(x_i))\}, \end{cases}$$

Also, with respect to an R tree, the distance between the R trees based on only a correspondence relationship among vertexes may be calculated by using, for example, the method described in the non-patent publication 5 (see non-patent publication).

Next, a method for calculating the distance between R trees in accordance with the method described in the non-patent publication 5 will be explained.

It should be noted that as to related symbols used to describe the distance between R trees, these related symbols are in compliance with the definition of the related symbols used to describe the distance between the RO trees. Also, it should be understood that in this definition, symbol "$T_a(x)$" and indicates an R tree, and symbol "$F_a(x)$" shows an unordered forest.

First, numbers are allotted to vertexes from a root of the R tree in the depth first order (by way of a depth-priority searching). Distances between subtrees are obtained in order from an R tree having a high-numbered root to an R tree having a low-numbered root, and finally, a distance between the entire R trees is obtained. That is, compute the distance between the smallest subtrees (consists only one vertex) firstly, and then using the above results, compute the distance between larger subtrees, and finally, we can get the distance between the two R trees.

A distance "$D(T_a(x), T_b(y))$" between the two subtrees (e.g., R trees) $T_a(x)$ and $T_b(y)$ indicated in FIG. 7 can be obtained by using a formula 5. It is so assumed that a Distance "$D(Fa(x), F_b(y))$" among unordered forests, and a distance D ($T_a(xi), T_b(y)$) $D(T_a(x), T_b(yi))$ among all of subtrees have already been obtained.

$$D(T_a(x), T_b(y)) = \min \quad \text{formula 5}$$
$$\begin{cases} S(x, y) + D(F_a(x), F_b(y)), \\ \min_{xi \in Ch(x)} \{D(T_a(x_i), T_b(y)) + \sum R(k) \mid k \in (V_a(x) - V_a(x_i))\}, \\ \min_{yi \in Ch(y)} \{D(T_a(x), T_b(y_i)) + \sum I(k) \mid k \in (V_b(y) - V_b(y_i))\}, \end{cases}$$

A distance between the two unordered forests "$F_a(x)$" and "$F_b(y)$" shown in FIG. 8, that is, "$D(F_a(x), F_b(y))$", can be calculated by using a formula 6.

$$D(F_a(x), F_b(y)) = \sum_{xi \in Ch(x)} \left(\sum R(k) \mid k \in V_a(x_i)\right) + \sum_{yj \in Ch(y)} \left(\sum I(k) \mid k \in V_b(y_j)\right) - W(M_{\max}) \quad \text{formula 6}$$

Figure 9:
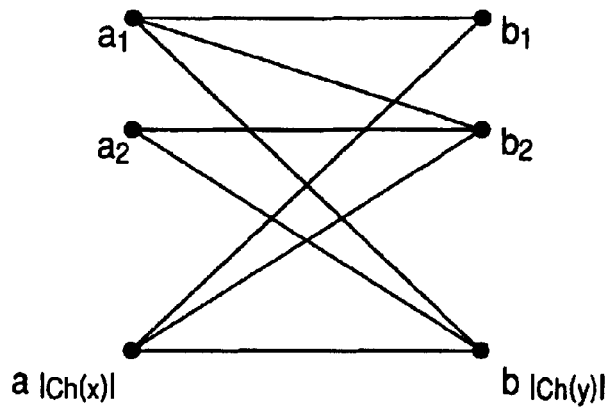
FIG. 9 is a diagram for showing an example of a bipartite graph.

A symbol "$W(M_{max})$" shown in the formula 6 denotes a maximum matching weight of a bipartite graph G (A, B, E) as shown in FIG. 9. A vertex "$a_i(\in A)$" of the bipartite graph G (A, B, E) represents a subtree "$T_a(x_1)(x_i \in Ch(x))$", which constitutes the unordered forest $F_a(x)$. Also, a vertex "$b_j(\in A)$" of the bipartite graph G (A, B, E) represents a subtree "$T_b(y_j)(y_j \in Ch(y))$", which constitutes the unordered forest $F_b(y)$.

Also, a weight "$w(e(a_i, b_j))$" of an edge "$e(a_i, b_j)$" between the vertex "$a_i(\in A)$" and the vertex "$b_j(\in B)$" of the bipartite graph G (A, B, E) are set in accordance with a formula 7. The maximum matching weight of the bipartite graph G (A, B, E) corresponds to a maximum value of a sum of the weight "$w(e(a_i, b_j))$" of the matched edge "$e(a_i, b_j)$" under maximum matching condition.

$$w(e(a_i, b_j)) = \sum R(k) \mid k \in V_a(x_i) + \sum I(k) \mid k \in V_b(y_j) - D(T_a(x_i), T_b(y_j)) \quad \text{formula 7}$$

The distance $D(T_a, T_b) = D(T_a(x=1), T_b(y=1))$ between either the RO trees or the R trees can be obtained by using the above-explained methods.

Next, the semantic content comparison section 9 obtains a distance between text sentences by using formula 8 or formula 9.

A symbol "$D(S_1, S_2)$" indicates a distance between a sentence "$S_1$" and a sentence "$S_2$", symbol "$T_1$" represents a tree structure (either RO tree or R tree) of the sentence "$S_1$", and symbol "$T_2$" shows a tree structure (either RO tree or R tree) of the sentence "S2", and symbol "$D(T_1, T_2)$" indicates a distance between the tree $T_1$ and the tree $T_2$.

$$D(S_1, S_2) = D(T_1, T_2) \quad \text{formula 8}$$

$$D(S_1, S_2) = \frac{D(T_1, T_2)}{|T_1| + |T_2|} \quad \text{formula 9}$$

[Calculation procedure of the distance between RO trees]

Next, a procedure for converting text sentences $S_1$ and $S_2$ into RO trees to obtain a distance between the text sentences $S_1$ and $S_2$ will be described with reference to a flow chart shown in FIG. 12.

The input two text sentences $S_1$ and $S_2$ are converted into RO trees $T_a$ and $T_b$ by using the morphological analysis section 2, the syntax-and-semantic analysis section 3, and the tree structure conversion section 4 (S01). At least the word information are allotted to vertexes of the trees $T_a$ and $T_b$ as shown in FIG. 5A. Alternatively, the word information and the case information may be allotted to the vertexes as shown in FIG. 4. Numbers from 1 to n are allotted to roots of all subtrees, which are included in the RO trees $T_a$ and $T_b$ (n denotes a positive integer). The numbers are allotted in the depth first order from the root of the RO tree (S02).

Next, x is set n1 and y is set n2 (n1 and n2 are number of the vertexes of the tree $T_a$ and number of the vertexes of the tree $T_b$, respectively) (S03 and S04). The distance calculation section 8 calculates the distance $D(F_a(x), F_b(y))$ between a forest $F_a(x)$ and a forest $F_b(y)$ by using the formula 2 (SO5). Incidentally, when distances between trees, between subtrees, and between forests are calculated, the distance calculation section 8 obtains the vertex substitution weight S(x, y), the vertex deletion weight R(x), and the vertex insertion weight I(y) from the vertex-mapping-weight calculation section 7 to calculate the distance.

Subsequently, the distance calculation section 8 calculates the distance $D(T_a(x), T_b(y))$ between the subtrees $T_a(x)$ and $T_b(y)$. When the subtree $T_a(x)$ is not a subtree consisting of one vertex (No at S06) and the subtree $T_b(y)$ is not a subtree consisting of one vertex (No at S07), the distance $D(T_a(x), T_b(y))$ is calculated by using the formula 1 (S10). When the subtree $T_a(x)$ is a subtree consisting of one vertex (Yes at S06), $D(T_a(x), T_b(y))$ is calculated by using the formula 3 (S08). When the subtree $T_b(x)$ is a subtree consisting of one vertex (Yes at S07), $D(T_a(x), T_b(y))$ is calculated by using the formula 4 (S08).

Next, the distance calculation section 8 determines whether or not y=1, that is, whether or not the vertex y is the root of the tree $T_b$ (S11). When y≠1 (No at S11), y is decremented by one (S11). Then, the process returns to S05. When y=1 (Yes at S11), the distance calculation section 8 determines whether or not x=1, that is, whether or not the vertex x is the root of the tree $T_a$ (S13). When x≠1 (No at S13), x is decremented by one (S14). Then, the process returns to S04. When x=1 (Yes at S13), this means that distances between all trees including the trees $T_a$ and $T_b$ are calculated. In other words, the distance $D(T_a(1), T_b(1))$ between the trees $T_a$ and $T_b$ has already been obtained. Therefore, the distance calculation section 8 outputs the distance $D(T_a(1), T_b(1))$ to the semantic content comparison section 9 through the memory 19. The semantic content comparison section 9 obtains a distance between the text sentences S1 and S2 on the basis of the input distance $D(T_a(1), T_b(1))$ and the formulae 7 and 8 (S15).

[Calculation Procedure of the Distance between R Trees]

Figure 13:
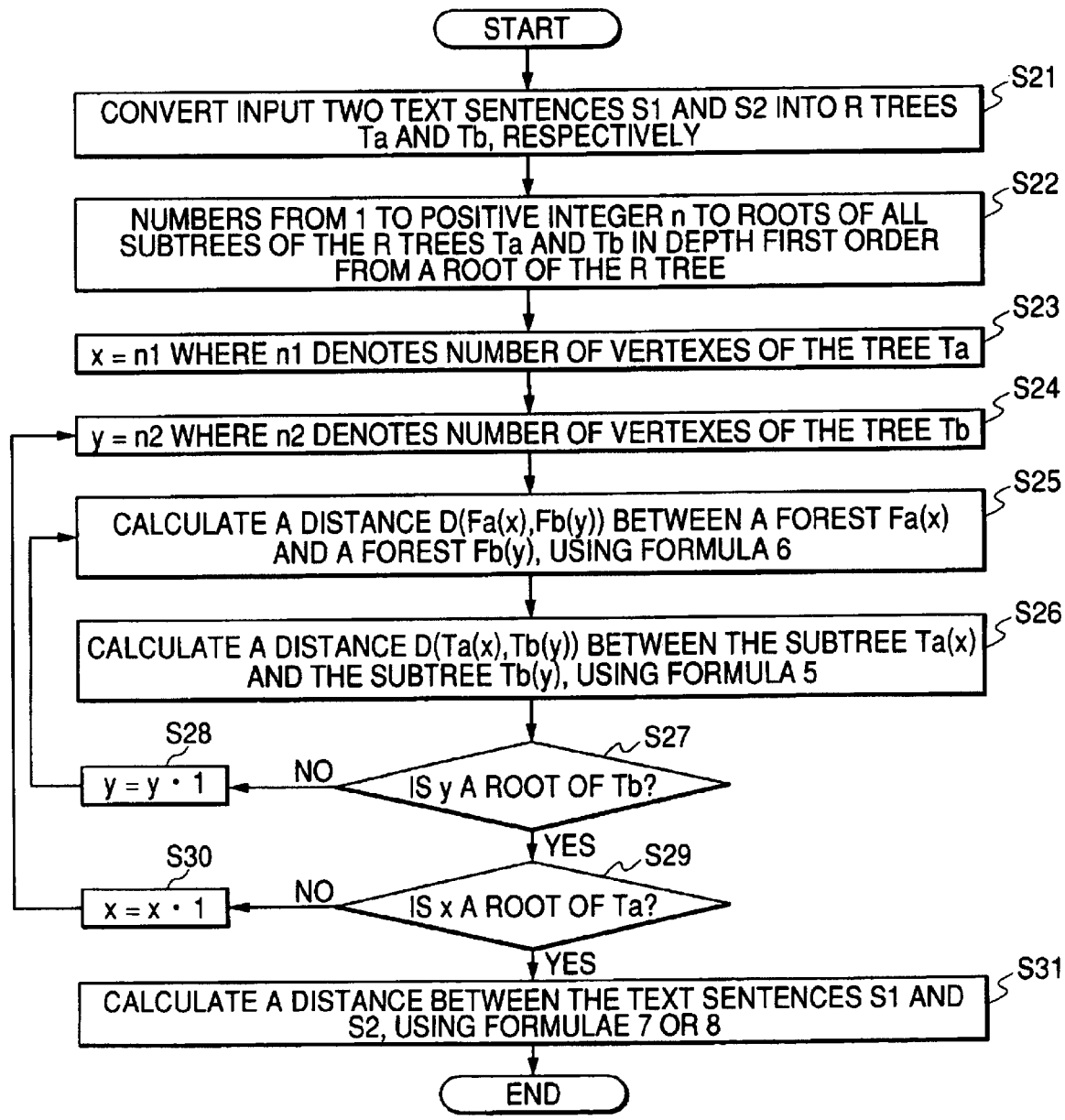
FIG. 13 is a diagram showing a flow chart of a procedure for calculating a distance between R trees.

A procedure for converting text sentences $S_1$ and $S_2$ into R trees to obtain a distance between the text sentences $S_1$ and $S_2$ will be described with reference to a flow chart shown in FIG. 13.

The input two text sentences S1 and S2 are converted into R trees $T_a$ and $T_b$ by using the morphological analysis section 2, the syntax-and-semantic analysis section 3, and the tree structure conversion section 4 (S21). At least the word information are allotted to vertexes of the trees $T_a$ and $T_b$ as shown in FIG. 5A. Alternatively, the word information and the case information may be allotted to the vertexes as shown in FIG. 4. Numbers from 1 to n are allotted to roots of all subtrees, which are included in the R trees $T_a$ and $T_b$ (n denotes a positive integer). The numbers are allotted in the depth first order from the root of the R tree (S22).

Next, x is set n1 and y is set n2 (n1 and n2 are number of the vertexes of the tree $T_a$ and number of the vertexes of the tree $T_b$, respectively) (S23, S24). The distance calculation section 8 calculates the distance $D(F_a(x), F_b(y))$ between a forest $F_a(x)$ and a forest $F_b(y)$ by using the formula 6 (S25). Incidentally, when distances between trees, between subtrees, and between forests are calculated, the distance calculation section 8 obtains the vertex substitution weight S(x, y), the vertex deletion weight R(x), and the vertex insertion weight I(y) from the vertex-mapping-weight calculation section 7 to calculate the distance.

Subsequently, the distance calculation section 8 calculates the distance $D(T_a(x), T_b(y))$ between the subtrees $T_a(x)$ and $T_b(y)$ (S26). Then, the distance calculation section 8 determines whether or not y=1, that is, whether or not the vertex y is a root of the tree $T_b$(S27). When y≠1 (No at S27), y is decremented by one (S28). Then, the process returns to S25 (that is, calculation object is changed to a larger subtree). When y=1 (Yes at S27), the distance calculation section 8 determines whether or not x=1, that is, whether or not the vertex x is a root of the tree $T_a$(S29). When x≠1 (No at S29), x is decremented by one (S30). Then, the process returns to S24. When x=1 (Yes at S29), this means that distances between all trees including the trees $T_a$ and $T_b$ are calculated. In other words, the distance $D(T_a(1), T_b(1))$ between the trees $T_a$ and $T_b$ has already been obtained. Therefore, the distance calculation section 8 outputs the distance $D(T_a(1), T_b(1))$ to the semantic content comparison section 9 through the memory 19. The semantic content comparison section 9 obtains a distance between the text sentences S1 and S2 on the basis of the input distance $D(T_a(1), T_b(1))$ and the formulae 7 and 8 (S31).

EXAMPLE

Next, a description will be given on an operation of the apparatus and the method for comparing the semantic contents of the text sentences according to the embodiment of the present invention, using a specific example.

A process and a result of obtaining the similarity (or the difference) between a sentence A "my wife, Hanako, has a cold" and a sentence B "my wife has a cold" will be give, using the apparatus for comparing the semantic contents of the text sentences according to the embodiment of the invention. In this example, the word deletion weight, the word insertion weight, the case deletion weight, and the case insertion weight are set to 70. The word substitution weight is set to 100, and also, the case substitution weight is set to 100.

Figure 10A:
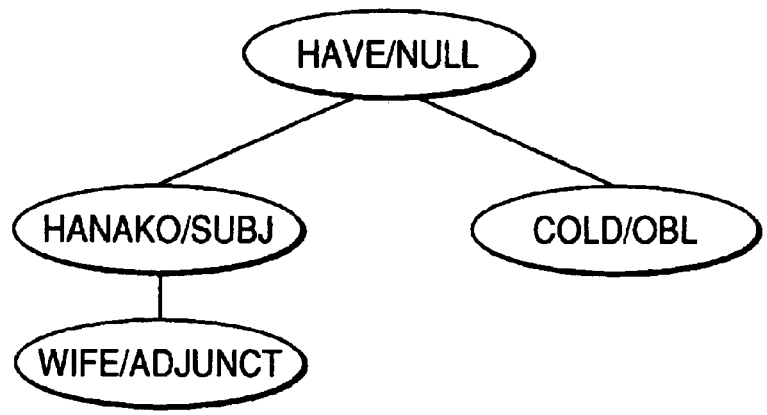
FIG. 10 is a diagram for representing tree structures of a sentence A and a sentence B.
Figure 10B:
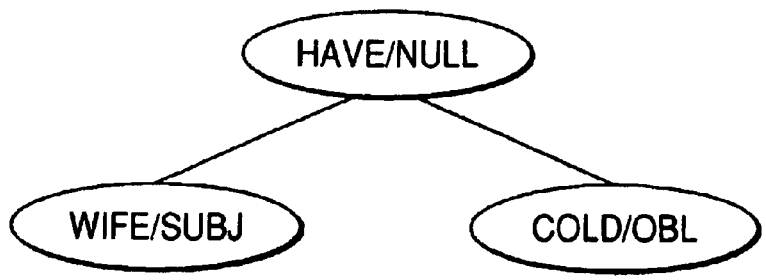

First, both the sentence A and the sentence B are morphologically analyzed. Then, the dependency relation analysis (syntax analysis) and the semantic analysis are performed with respect to the sentences A and B. As a result, these two sentences A and B are converted into, for instance, a rooted and ordered tree $T_A$ and a rooted and ordered tree $T_B$ shown in FIG. 10A and FIG. 10B, respectively.

Next, the comparing apparatus calculates the distance between the two RO trees in accordance with the above described procedure. Finally, the comparing apparatus calculates the distance between the two text sentences A and B by using either the formula 8 or the formula 9.

When the formula 8 is used, the distance between the text sentence A and the text sentence B becomes D(A, B)=240. When the formula 9 is used, the distance between the text sentence A and the text sentence B becomes D(A, B)=34 (correctly speaking, 240/7). The distance between the two RO trees $T_A$ and $T_B$ is D $(T_A, T_B)$=240. The total number of vertexes of the two RO trees $T_A$ and $T_B$ is equal to 7.

Figure 11:
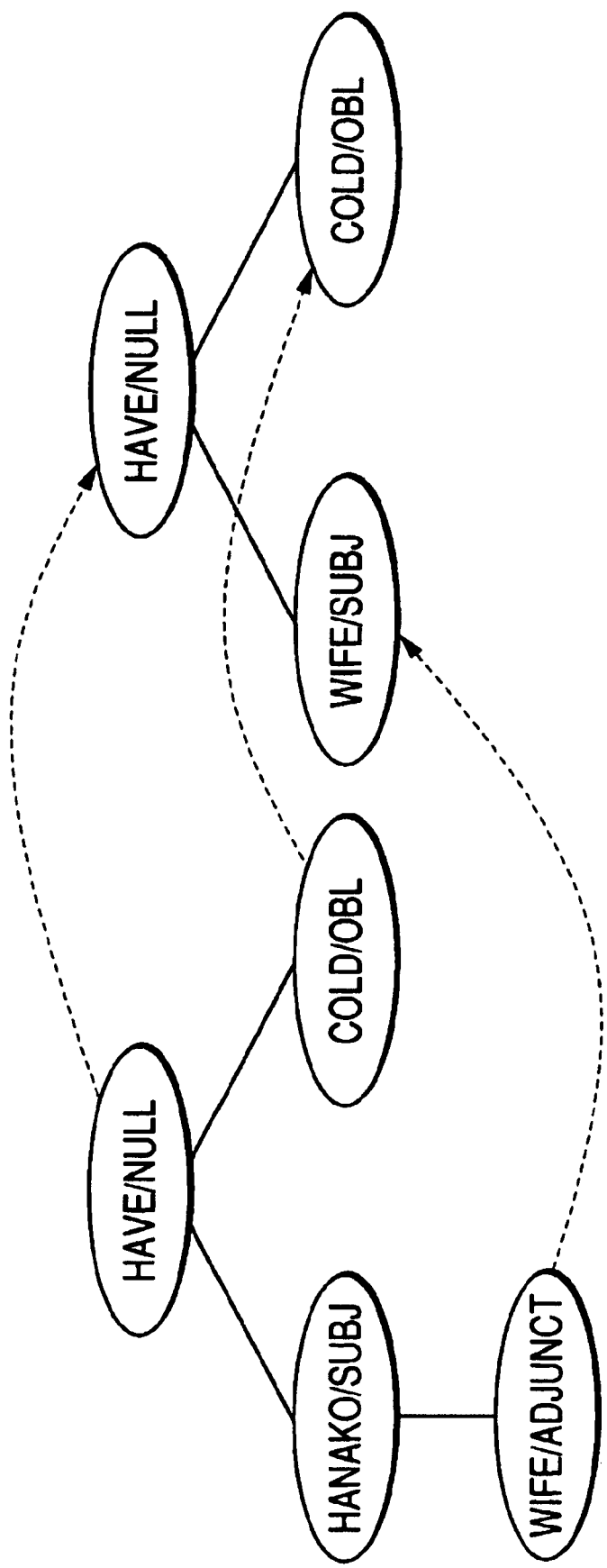
FIG. 11 is a diagram for showing an example of mapping, which gives a distance between RO trees of the sentences A and B.

FIG. 11 shows one of mappings between the RO trees, which gives the distance $D(T_A, T_B)$. As shown in FIG. 11, the distance between the two RO trees $T_A$ and $T_B$ becomes a sum of the deletion weight of 70+70=140, which is required for the deletion of the word and case of "Hanako/SUBJ", and the substitution weight of 100, which is required for the substitution of the case "ADJUNCT" for the case "SUBJ".

Accordingly, in the text sentence comparing apparatus and the text sentence comparing method according to the invention, text sentences are morphologically analyzed, and either analyzed in dependency relation (syntax analysis) or semantically analyzed. Then, the sentence structure and meaning of the entire analyzed text sentences converted into either RO trees or R trees on the graph theory. That is, the sentence structure and meaning of the entire text sentences are converted into either the RO trees or the R trees. Dependency relation information (case information) between words, which relates to word information (including the attribute of the word) appearing in the text sentences, is stored in vertexes of either the RO trees or the R trees or only the word information (including the attribute of the word) appearing in the text sentences is stored in the vertexes of either the RO trees or the R trees. A distance between either the RO trees or the R trees, which is based on a correspondence relationship between the vertexes, is applied to a distance measuring differences in semantic contents between the text sentences. The differences in semantic contents between the text sentences are compared by using the distance between either the RO trees or the R trees. Thereby, the semantic contents between the input two text sentences can be obtained with high precision and in a real time.

Specifically, in the invention, the distance between the text sentences is defined based upon either the difference in the word information between the text sentences or the difference is the word information, the difference in the case information, and the difference in the entire constructions between the text sentences. Therefore, the distance functions according to the invention have the following three good natures. That is, (1) a distance between two text sentences, whose meanings are similar to each other and whose constructions are similar to each other is obtained as a small value; (2) a distance between two text sentences whose meanings are different from each other and whose constructions are not similar to each other is obtained as a very large value; and (3) a distance between two text sentences whose meanings are different from each other, but whose constructions are similar to each other is obtained based upon either a difference in word information or both the difference in word information and a difference in case information. As a result, the distance between the two text sentences can be calculated in high precision.

Also, in this example, as to the RO tree, the distance between the two text sentences can be calculated on the order of $n^2$ (namely, squared total number "n" of vertexes of an RO tree, i.e. "$O(n^2)$"). As to the R tree, the distance between the two text sentences can be calculated on the order of $n^2$ and "m" (namely, squared total number "n" of vertexes of R tree and maximum number "m" of children, i.e., "$O(mn^2)$"). Accordingly, the distance between the two text sentences can be calculated in real time.

It should also be noted that as the arrangement of the text sentence comparing apparatus of the present invention, the present invention is not limited only to the above-explained arrangements, but may be realized by employing various other arrangements. Alternatively, the inventive idea of the present invention may be provided in the form of, for example, a program capable of realizing the comparing method according to the present invention.

Also, as the application field of the present invention, the present invention is not limited only to the above-described application fields, but may be applied to other various technical fields.

Alternatively, as the various sorts of process operations executed in the present invention, such an arrangement may be employed in which, for example, a processor executes a control program stored in a ROM (Read-Only Memory) in a hardware resource equipped with the processor and a memory. Also, the respective function means for executing this process operation may be arranged as independent hardware circuits.

Alternatively, the present invention may be grasped as a computer readable recording medium and a relevant program itself, while the computer readable recording medium is realized as a CD (Compact Disc)-ROM and a floppy (registered trademark) disk which has previously stored there into the above-explained control program. Thus, since this control program is entered from the recording medium to the computer so as to be executed by the processor, the process operations according to the present invention may be executed.

As previously explained in detail, in accordance with the text sentence comparing apparatus and the text sentence comparing method according to the present invention, both the entire constructions and the meanings of the text sentences are expressed by either the RO trees or the R trees on the graph theory. The differences in the semantic contents between the text sentences are compared with each other by employing either the distances between the RO trees based upon either the correspondence relationship among the vertexes or the distances between the R trees based upon the correspondence relationship among the vertexes. As a result, the semantic contents between the two inputted text sentences can be grasped in high precision and in real time. In accordance with the invention, for instance, not only the semantic contents of the documents can be compared with each other and the documents can be classified based upon the semantic contents, but also the information searching intention by the user can be understood. In other words, since the request of the user, which is represented in the natural language, is compared with the storage content of the database, which has been constructed by way of the previous learning, the information searching intention of the user can be predicted.

In the embodiment of the invention, the description has been given on the English text sentences. It goes without saying that the invention can be applied to any natural languages such as Japanese, Chinese, French, and German.

FIG. 1
1 external storage apparatus
2 morphological analysis section
3 syntactic-and-semantic analysis section
4 tree structure conversion section
5 word-mapping-weight calculation section
6 case-mapping-weight calculation section
7 vertex-mapping-weight calculation section
8 distance calculation section
9 semantic content comparison section
10 storage section
11-19 memory FIG. 2
21 external storage apparatus
22 keyboard
23 display
24 processor unit
25 module for obtaining a distance between text sentences FIG. 3
A/DT teacher/NN teaches/VBZ English/NNP to/TO students/NNS Where, DT indicates Determiner, NN indicates Noun(singular or mass), VBZ indicates Verb(3rd ps. sing. Present), NNP indicates Proper noun(singular), TO indicates to, and NNS indicates Noun(plural).

Figure 12:
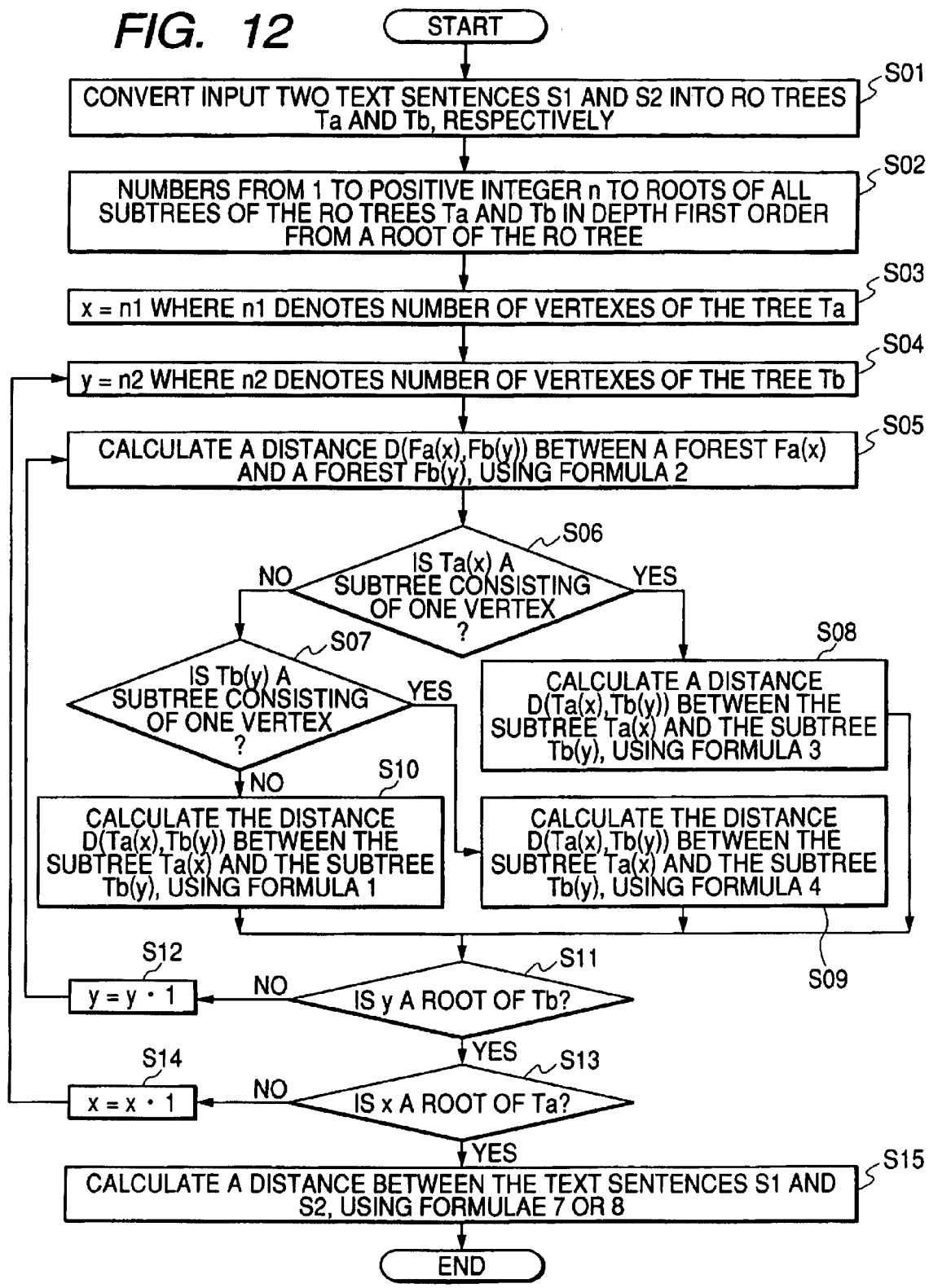
FIG. 12 is a diagram showing a flow chart of a procedure for calculating a distance between RO trees.

FIG. 12
S01 convert input two text sentences S1 and S2 into RO trees Ta and Tb, respectively
S02 numbers from 1 to positive integer n to roots of all subtrees of the RO trees Ta and Tb in depth first order from a root of the RO tree
S03 x=n1 where n1 denotes number of vertexes of the tree Ta
S04 y=n2 where n2 denotes number of vertexes of the tree Tb
SOS calculate a distance D(Fa(x), Fb(y)) between a forest Fa(x) and a forest Fb(y), using formula 2
S06 Is Ta(x) a subtree consisting of one vertex?
S07 Is Tb(y) a subtree consisting of one vertex?
S08 calculate a distance D(Ta(x), Tb(y)) between the subtree Ta(x) and the subtree Tb(y), using formula 3

S09 calculate the distance D (Ta (x), Tb (y)) between the subtree Ta(x) and the subtree Tb(y), using formula 4
S10 calculate the distance D (Ta (x), Tb (y)) between the subtree Ta(x) and the subtree Tb(y), using formula 1
S11 Is y a root of Tb?
S13 Is x a root of Ta?
S15 calculate a distance between the text sentences S1 and S2, using formulae 7 or 8

FIG. 13

S21 convert input two text sentences S1 and S2 into R trees Ta and Tb, respectively
S22 numbers from 1 to positive integer n to roots of all subtrees of the R trees Ta and Tb in depth first order from a root of the R tree
S23 x=n1 where n1 denotes number of vertexes of the tree Ta
S24 y=n2 where n2 denotes number of vertexes of the tree Tb
S25 calculate a distance D(Fa(x), Fb(y)) between a forest Fa(x) and a forest Fb(y), using formula 6
S26 calculate a distance D(Ta(x), Tb(y)) between the subtree Ta(x) and the subtree Tb(y), using formula 5
S27 Is y a root of Tb?
S29 Is x a root of Ta?
S31 calculate a distance between the text sentences S1 and S2, using formulae 7 or 8

What is claimed is:

1. A computer-implemented text sentence comparison method comprising:
 converting, using a processor, a first text sentence and a second text sentence into a first R tree and a second R tree, respectively;
 calculating a distance between the first R tree and the second R tree on the basis of a distance between two R trees, which is defined at least in accordance with a condition of a mapping between vertexes of the two R trees, the calculation of the distance between the first R tree and the second R tree being performed using the processor and including calculation of:
  a distance between a forest, which the first R tree includes, and a forest, which the second R tree includes;
  a distance between a subtree, which the first R tree includes, and a subtree, which the second R tree includes; and
  a vertex mapping weight of a mapping from the first R tree to the second R tree;
 calculating a distance between the first text sentence and the second text sentence, using the processor, on the basis of the following expression: the distance=(the calculated distance between the first R tree and the second R tree)/(a sum of vertexes in the first R tree and the second R tree),
 wherein in the converting,
  word information and case information in the first text sentence are assigned to respective vertexes of the first R tree so that at least one of the vertexes of the first R tree contains the word information and the case information in the first text sentence,
  word information and case information in the second text sentence are assigned to respective vertexes of the second R tree so that at least one of the vertexes of the second R tree contains the word information and the case information in the second sentence, and
  the vertex mapping weight is calculated on the basis of word substitution weight, word deletion weight, word insertion weight, case substitution weight, case deletion weight and case insertion weight; and
 outputting the calculated distance between the first text sentence and the second text sentence as an indication of semantic content similarity between the sentences.

2. The text sentence comparison method according to claim 1, wherein:
 in the conversion:
  words included in the first text sentence are allotted to vertexes of the first R trees; and
  words included in the second text sentence are allotted to vertexes of the second R trees; and
 the vertex mapping weight is calculated on the basis of word substitution weight, word deletion weight, and word insertion weight.

3. The text sentence comparison method according to claim 1, further comprising:
 setting the condition of the mapping between the two R trees.

4. The text sentence comparison method according to claim 1, wherein the condition of the mapping between the two R trees includes:
 the mapping is a one-to-one mapping;
 the mapping preserves parent-child relationship; and
 the mapping preserves structure.

5. The text sentence comparison method according to claim 1, further comprising:
 inputting the first text sentence and the second text sentence; and
 outputting the calculated distance between the first text sentence and the second text sentence.

6. A computer-implemented text sentence comparison method comprising:
 converting, using a processor, a first text sentence and a second text sentence into a first RO tree and a second RO tree, respectively;
 calculating a distance between the first RO tree and the second RO tree on the basis of a distance between two RO trees, which is defined at least in accordance with a condition of a mapping between vertexes of the two RO trees, the calculation of the distance between the first RO tree and the second RO tree being performed by the processor and including calculating:
  a distance between a forest, which the first RO tree includes, and a forest, which the second RO tree includes;
  a distance between a subtree, which the first RO tree includes, and a subtree, which the second RO tree includes; and
  a vertex mapping weight of a mapping from the first RO tree to the second RO tree;
 calculating a distance between the first text sentence and the second text sentence, using the processor, on the basis of the calculated distance between the first RO tree and the second RO tree,
 wherein in the converting,
  word information and case information in the first text sentence are assigned to respective vertexes of the first RO tree so that at least one of the vertexes of the first RO tree contains the word information and the case information in the first text sentence, and
  word information and case information in the second text sentence are assigned to respective vertexes of the second RO tree so that at least one of the vertexes of the second RO tree contains the word information and the case information in the second sentence, and
  the vertex mapping weight is calculated on the basis of word substitution weight, word deletion weight, word insertion weight, case substitution weight, case deletion weight and case insertion weight; and
outputting the calculated distance between the first text sentence and the second text sentence as an indication of semantic content similarity between the sentences.

7. The text sentence comparison method according to claim 6, wherein:
in the conversion:
words included in the first text sentence are allotted to vertexes of the first RO trees; and
words included in the second text sentence are allotted to vertexes of the second RO trees; and
the vertex mapping weight is calculated on the basis of word substitution weight, word deletion weight, and word insertion weight.

8. The text sentence comparison method according to claim 6, further comprising:
setting the condition of the mapping between the two RO trees.

9. The text sentence comparison method according to claim 6, wherein the condition of the mapping between the two RO trees includes:
the mapping is a one-to-one mapping;
the mapping preserves parent-child relationship; and
the mapping preserves brother relationship;
the mapping preserves structure.

10. The text sentence comparison method according to claim 6, further comprising:
inputting the first text sentence and the second text sentence; and
outputting the calculated distance between the first text sentence and the second text sentence.

11. A text sentence comparison apparatus, the text sentence comparison apparatus containing a computer-readable storage medium encoded with a program of instructions that when executed by a computer causes the computer to execute the following method:
inputting a first text sentence and a second text sentence;
converting the first text sentence and the second text sentence into a first R tree and a second R tree, respectively;
calculating a distance between the first R tree and the second R tree on the basis of the following expression:
the distance=(the calculated distance between the first R tree and the second R tree)/(a sum of vertexes in the first R tree and the second R tree), the distance calculation also calculating:
a distance between a forest, which the first R tree includes, and a forest, which the second R tree includes; and
a distance between a subtree, which the first R tree includes, and a subtree, which the second R tree includes;
calculating a distance between the first text sentence and the second text sentence on the basis of the calculated distance between the first R tree and the second R tree;
calculating a vertex mapping weight of mapping from the first R tree to the second R tree; and
outputting the calculated distance between the first text sentence and the second text sentence as an indication of semantic content similarity between the sentences,
wherein in the tree structure conversion,
word information and case information in the first text sentence are assigned to respective vertexes of the first R tree so that at least one of the vertexes of the first R tree contains the word information and the case information in the first text sentence, word information and case information in the second text sentence are assigned to respective vertexes of the second R tree so that at least one of the vertexes of the second R tree contains the word information and the case information in the second sentence, and
the vertex mapping weight is calculated on the basis of word substitution weight, word deletion weight, word insertion weight, case substitution weight, case deletion weight and case insertion weight.

12. The text sentence comparison apparatus according to claim 11, wherein:
the tree structure conversion
allots words included in the first text sentence to vertexes of the first R trees, and
allots words included in the second text sentence to vertexes of the second R trees; and
the vertex mapping weight calculation calculates the vertex mapping weight on the basis of word substitution weight, word deletion weight, and word insertion weight.

13. The text sentence comparison apparatus according to claim 11, further comprising:
allowing a user to set the condition of the mapping between the two R trees.

14. The text sentence comparison apparatus according to claim 11, wherein the condition of the mapping between the two R trees includes:
the mapping is a one-to-one mapping;
the mapping preserves parent-child relationship; and
the mapping preserves structure.

15. A text sentence comparison apparatus, the text sentence comparison apparatus containing a computer-readable storage medium encoded with a program of instructions that when executed by a computer cause the computer to execute the following method:
inputting a first text sentence and a second text sentence;
converting the first text sentence and the second text sentence into a first RO tree and a second RO tree, respectively;
calculating a distance between the first RO tree and the second RO tree on the basis of a distance between two RO trees, which is defined at least in accordance with a condition of a mapping between vertexes of the two RO trees, the distance calculation also calculating:
a distance between a forest, which the first RO tree includes, and a forest, which the second RO tree includes;
a distance between a subtree, which the first RO tree includes, and a subtree, which the second RO tree includes; and
a vertex mapping weight of a mapping from the first RO tree to the second RO tree;
calculating a distance between the first text sentence and the second text sentence on the basis of the calculated distance between the first RO tree and the second RO tree;
calculating a vertex mapping weight of a mapping from the first RO tree to the second RO tree; and
outputting the calculated distance between the first text sentence and the second text sentence as an indication of semantic content similarity between the sentences,
wherein in the tree structure conversion,
word information and case information in the first text sentence are assigned to respective vertexes of the first RO tree so that at least one of the vertexes of the first RO tree contains the word information and the case information in the first text sentence, word information and case information in the second text sentence are assigned to respective vertexes of the second RO tree so that at least one of the vertexes of the second RO tree contains the word information and the case information in the second sentence, and the vertex mapping weight is calculated on the basis of word substitution weight, word deletion weight, word insertion weight, case substitution weight, case deletion weight and case insertion weight.

16. The text sentence comparison apparatus according to claim 15, wherein:

the tree structure conversion allots words included in the first text sentence to vertexes of the first RO trees, and allots words included in the second text sentence to vertexes of the second RO trees; and the vertex mapping weight calculation calculates the vertex mapping weight on the basis of word substitution weight, word deletion weight, and word insertion weight.

17. The text sentence comparison apparatus according to claim 15, further comprising:

allowing a user to set the condition of the mapping between the two RO trees.

18. The text sentence comparison apparatus according to claim 15, wherein the condition of the mapping between the two RO trees includes:

the mapping is a one-to-one mapping;

the mapping preserves parent-child relationship; and the mapping preserves brother relationship;

the mapping preserves structure.

* * * * *